UNITED STATES PATENT OFFICE.

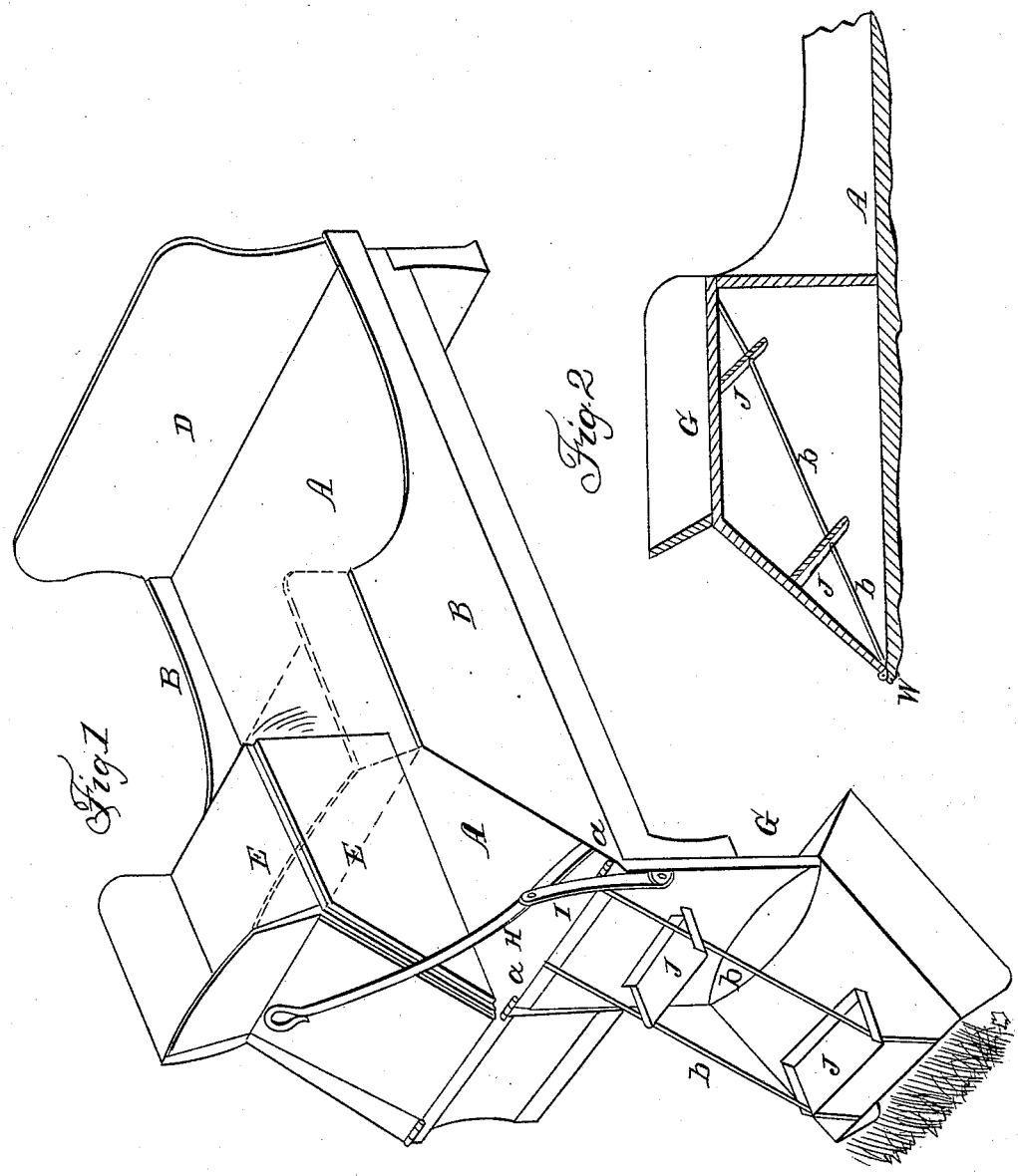

E. S. WICKLIN AND J. D. WEAVER, OF CARLINVILLE, ILLINOIS.

CARRIAGE.

Specification of Letters Patent No. 29,931, dated September 4, 1860.

*To all whom it may concern:*

Be it known that we, E. S. WICKLIN and J. D. WEAVER, both of Carlinville, in the county of Macoupin and State of Illinois, have invented a new and useful Improvement in Carriages; and we do hereby declare that the following is a full, clear, and exact description of the same, reference being had to the accompanying drawings, making part of this specification, in which—

Figure 1 shows a perspective view of a buggy body with two seats one of which is turned back showing steps. Fig. 2 is a section taken vertically and longitudinally through one of the buggy seats when the same is in its proper position as a seat.

Similar letters of reference indicate corresponding parts in both figures.

The object of this invention is to make a buggy easy of access from the rear to avoid the wheels in case of muddy weather, or an accident by falling under them should the horse suddenly start.

It consists in dividing the seat and box vertically through the middle and hinging one or both to the floor of the buggy at the back end, as will be hereinafter described, said seat being furnished on its under side with suitable steps, which, when the seat is thrown back will serve for an entrance up into, or as a passage out of the buggy, when the seat may be returned to its former position, as will be hereinafter described and represented.

To enable those skilled in the art to fully understand our invention we will proceed to describe its construction and operation.

This invention it will be seen is equally as applicable to a narrow one seat buggy as to a two seat buggy.

In the drawings, A is the floor of a buggy; B, the sides, and D, the dash-board.

E is one seat, which in the present instance is made fast to the floor, and side B, in the usual manner. G, is the other seat, the buggy being capable of seating two persons, which is made to all intents and purposes like the other or like the half of any common double seat divided vertically through the middle. The lower edge of the back board of the box of this seat is hinged to the rear edge *a*, of the floor A, as shown clearly in Fig. 1, in such a manner that the seat and back board of the box may be thrown back, as shown in the drawings.

H is a lever and I, a link jointed to the lever, and also to the back board of the seat box, by means of this lever, H, the seat may be thrown back or returned to its original position by a person in the buggy.

J, J are two steps, one on the back board of the box, and the other on the bottom of the seat, which are arranged in such a position and braced by rods *b*, *b*, that when the seat is thrown back to the position represented in Fig. 1, they will be in a horizontal plane and serve as steps to afford an easy entrance up into the buggy, or an exit from behind the buggy.

Springs may be suitably applied to the hinge for preventing a too rapid descent of the seat should it be allowed to fall suddenly, which springs would assist in returning the seat to its position as a seat.

From this description it will be seen that by simply hinging the divided seat or seats to the back end of the floor of the buggy and furnishing them with stepping boards as described, the seat will serve as a seat and as steps whereby to obtain easy access into the buggy from behind.

What we claim as new and desire to secure by Letters Patent, is—

A buggy seat, divided or not, hinged to the back end of the floor of the buggy and furnished with stepping boards on its under side substantially as set forth, so as to serve the two-fold purpose of a seat and as steps by which to enter or leave the buggy from behind.

E. S. WICKLIN.
J. D. WEAVER.

Witnesses:
  H. W. KERR,
  JAMES GLENN.